C. COMSTOCK.
Steam-Plow.

No. 46,995.

7 Sheets—Sheet 1.

Patented Mar. 28, 1865.

Figure 1:
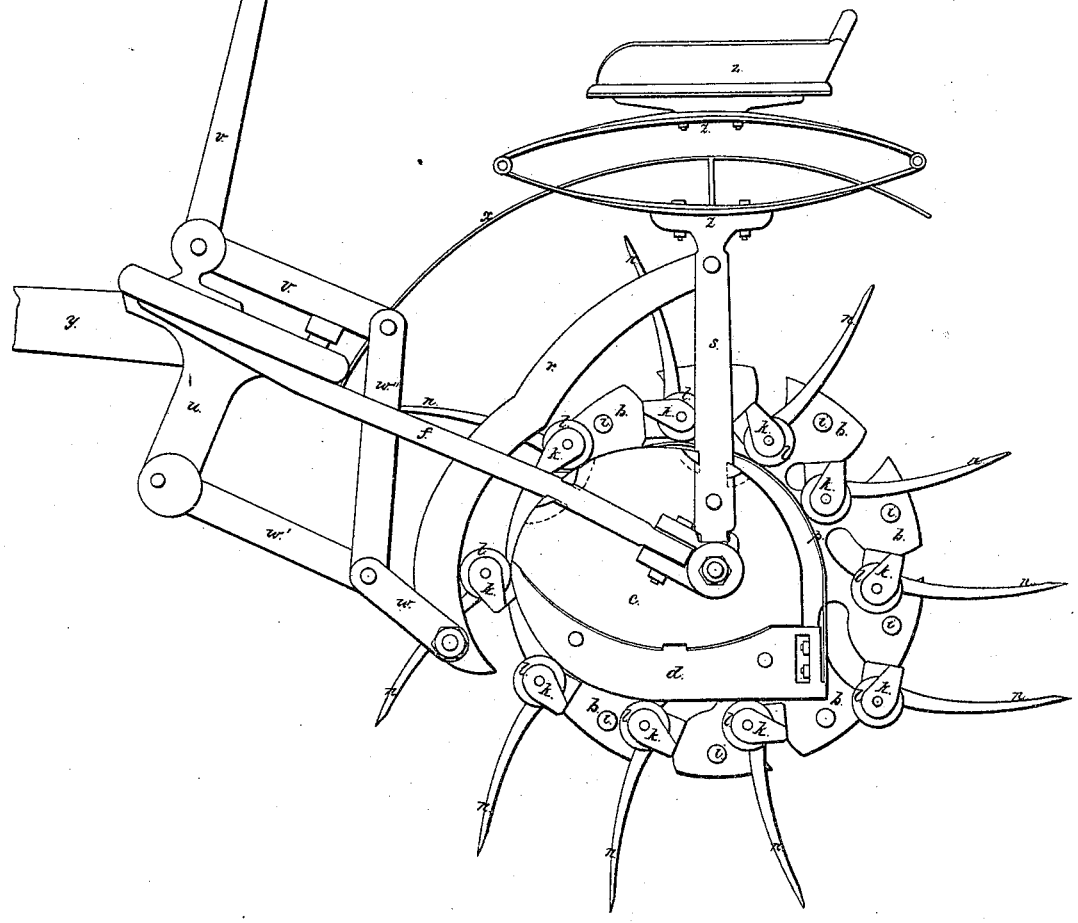
Figure 2:
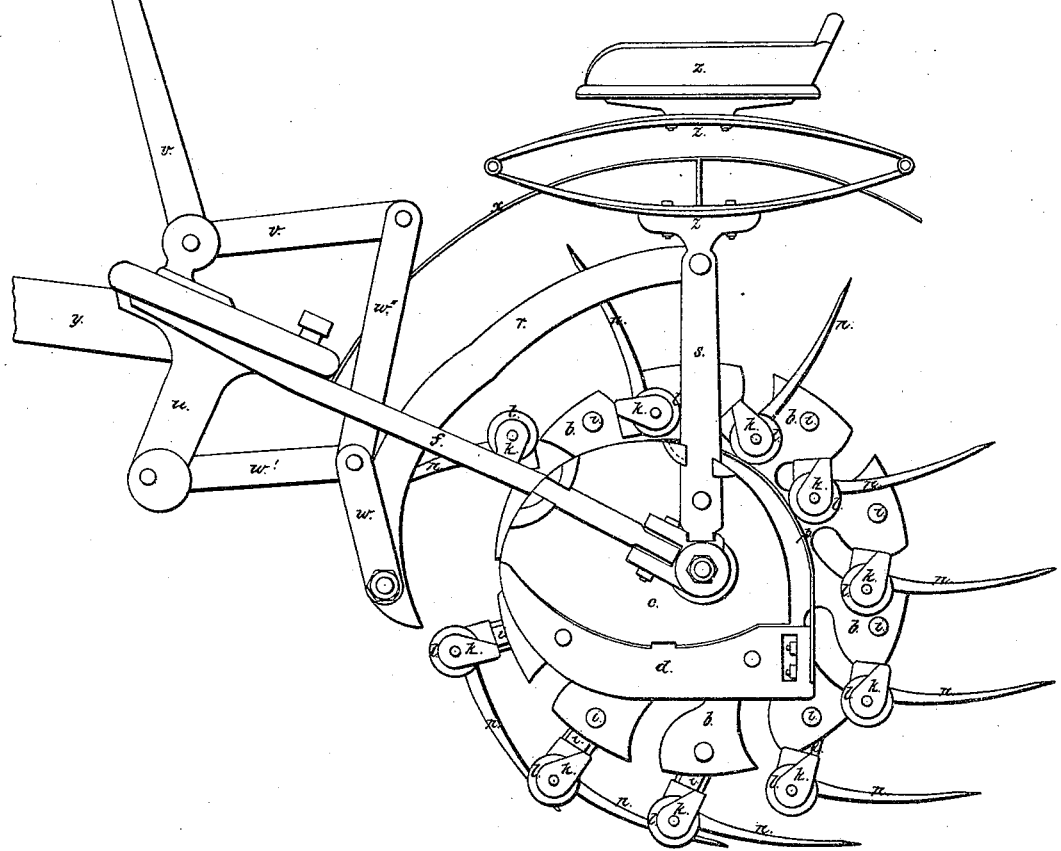
Figure 3:
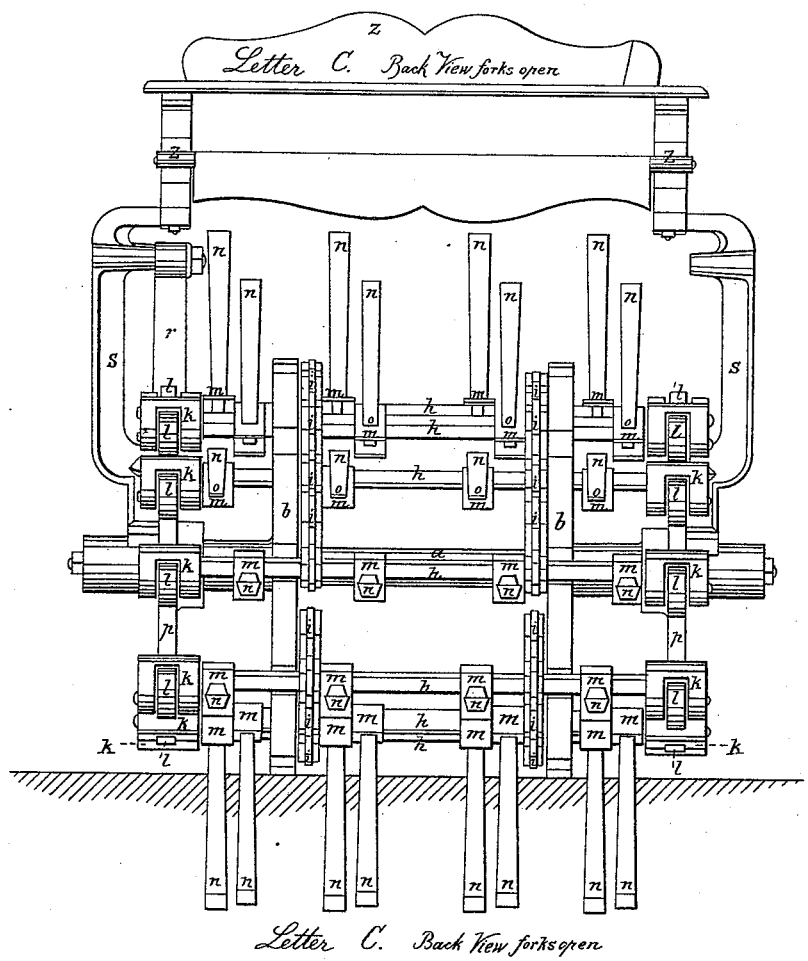

Fig. 1. Letter A Side View.

Witnesses:
T. Smith
L. Jones.

Inventor:
C. Comstock
by Atty Thos. T. Everett

AM. PHOTO-LITHO. CO. N.Y. (OSBORNE'S PROCESS.)

C. COMSTOCK.

Steam-Plow.

No. 46,995.

7 Sheets—Sheet 3.

Patented Mar. 28, 1865.

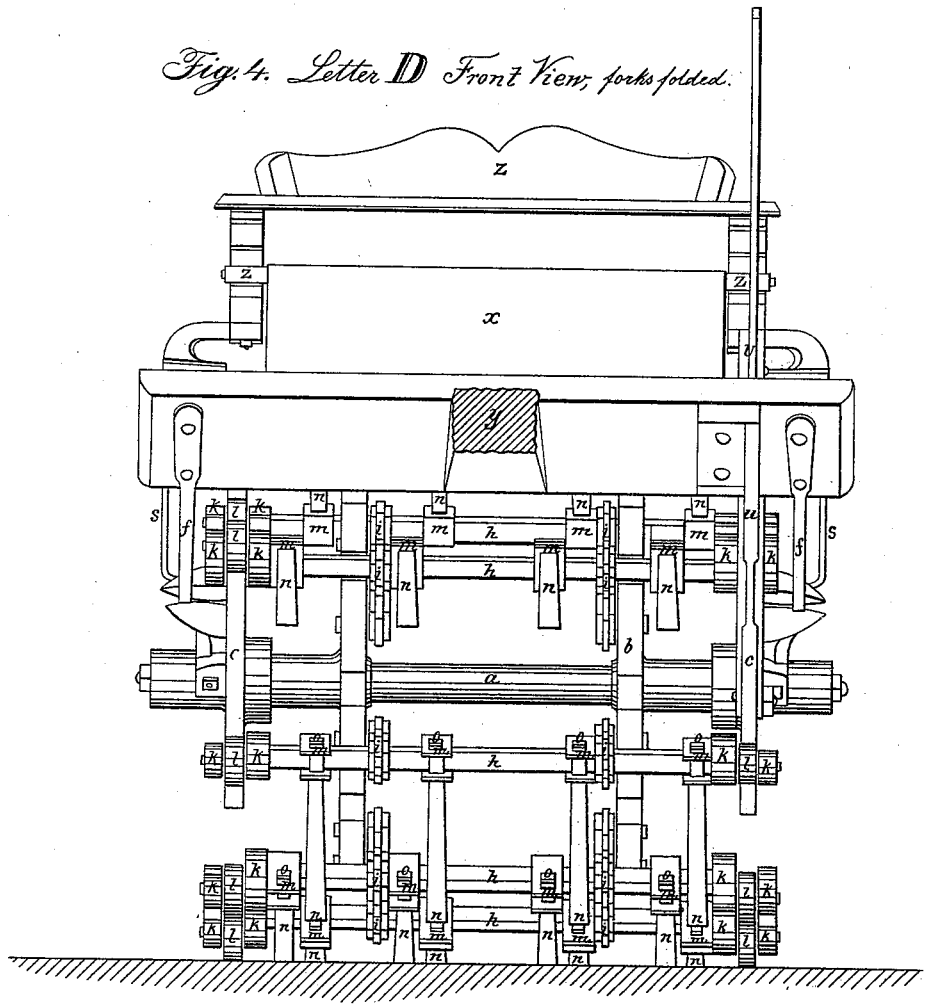

C. COMSTOCK.
Steam-Plow.
No. 46,995.
7 Sheets—Sheet 5.
Patented Mar. 28, 1865.
Fig. 5. Letter E. Top View.
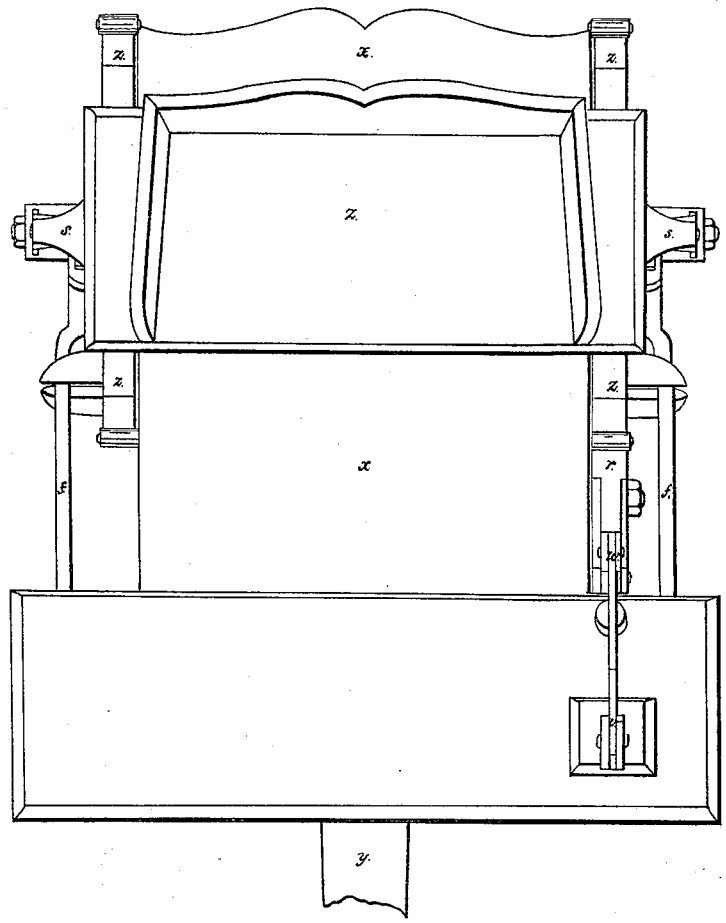
Witnesses:
T. Smith
L. Jones.
Inventor:
C. Comstock
by Atty Theo. T. Everett

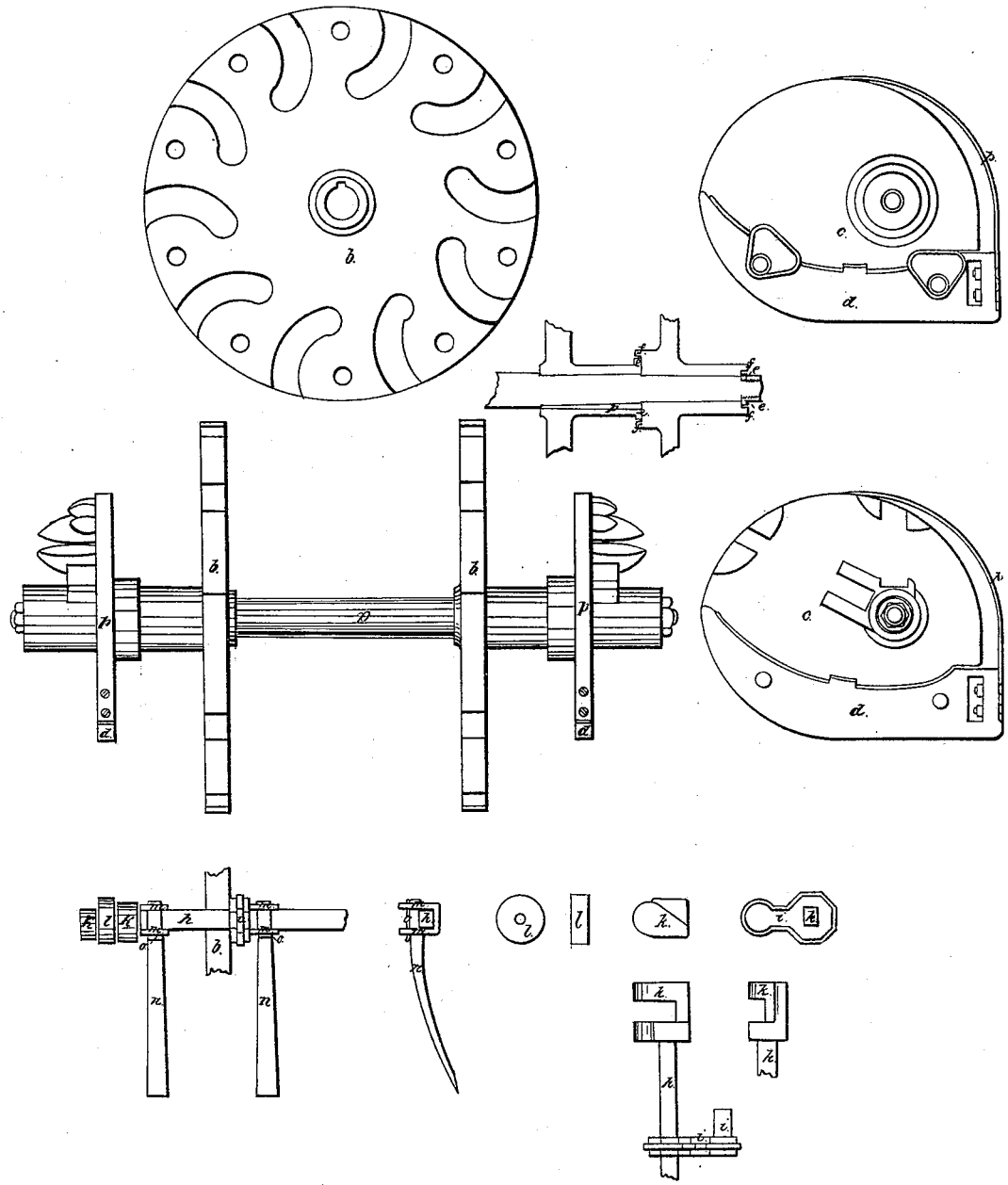

C. COMSTOCK.
Steam-Plow.
No. 46,995.
7 Sheets—Sheet 7.
Patented Mar. 28, 1865.
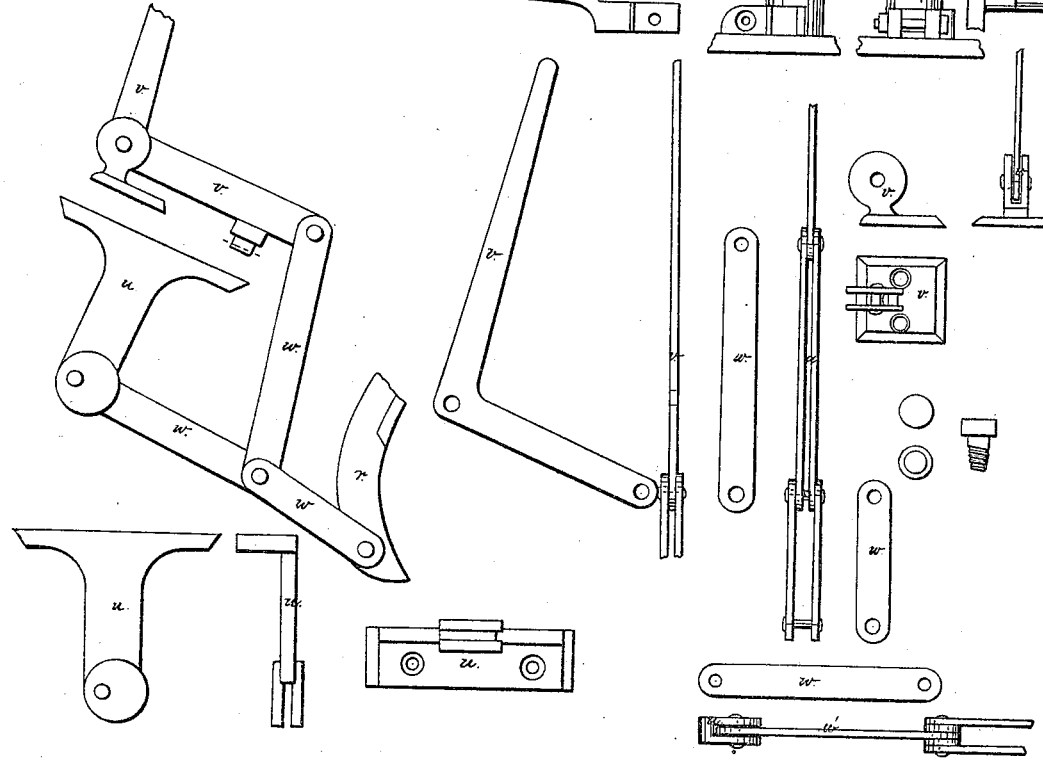
Fig. 7. Letter G. Sectional Parts.
Witnesses:
T. Smith
L. Jones.
Inventor:
C. Comstock
by Atty. Thos. F. Coonett

UNITED STATES PATENT OFFICE.

CICERO COMSTOCK, OF MILWAUKEE, WISCONSIN.

IMPROVED ROTARY SPADER.

Specification forming part of Letters Patent No. 46,995, dated March 28, 1865.

*To all whom it may concern:*

Be it known that I, CICERO COMSTOCK, of the city of Milwaukee, in the State of Wisconsin, have invented certain new and useful Improvements on Rotary Spaders or Spading-Machines; and I do hereby declare that the following is a full, clear, and exact description thereof, reference being had to the accompanying drawings, and to the letters and marks thereon.

In general my improvements relate to that class of spading-machines or rotary spaders where, by the forward movement of the machine and the rotation of the main wheels, and controlled to a certain extent by a fixed or stationary cam, the tine or teeth and their shafts are moved around with their wheels, the teeth entering the earth and acting thereon, perfectly and completely performing the functions of any implement or machine that can be used for putting the soil in the proper condition for the further steps or procedure for cultivation—a character or class of machines upon which I have already patents covering certain features, and to which the improvements of this application are to a greater or lesser extent allied.

The drawings forming part of this specification show by several figures the construction and arrangement of the various parts which make up a rotary spader having my improvements, such parts being fully represented and referred to by explanatory notes and marks and letters on said drawings, the marks and letters used being the same in each of the figures where like or corresponding parts are shown.

Upon the main axle $a$ the main wheels $b$ are affixed, the shaft $h$ of the fork tines or teeth $n$ having their bearings in the main wheels $b$, and there being in the main wheels recesses for allowing the necessary movements of the fork-shafts.

The main axle $a$ is turned off or diminished in its diameter near to and at each end for the fitting thereon of the hubs of the main wheels and the fitting around of the hubs of the stationary cams $c$, each of which cams has a shoe or detachable piece, $d$, a spring, $p$, and a movable part or section, $r$.

The teeth or tines $n$ are curved widest at the point, with a notch on the concave side of the head to embrace the fork-bar and clamp, and sharpened at the point by being beveled on the concave side. Each tooth or tine is secured to the fork bar or shaft by a stirrup, $m$, which embraces the bar and head of the tine, and by a key, $o$.

Lugs $k$ are cast on the ends of the fork-bars, within which or to which are hung the friction-wheels $l$.

The cranks or handles are also cast upon the fork-bars, and so located thereon in reference to the main wheels as that when the main wheels are keyed in place the forks will be in their proper position.

The fork-bars will be made of steel in preference to any other metal.

The main wheels $a$ are secured to the axle by driving keys $g$ toward the center of the machine, so that the hubs of the cams will bear against the heads of the keys and hold the keys in place, the inner and outer ends of the hubs of the cams being recessed, so as to form a chamber or socket, $f$, for the fitting in of the collar $e$ of the wheel-hub and the securing-nut $e$ of the axle, by which means dirt will be excluded from the interior of the cam-hub.

The tines $n$ are alternated on their shafts or bars, so as to allow them, when folded, to rest on the shafts or bars.

The spring $p$ is secured on or near the back part of the cam. The forks in lifting the earth are sometimes under a quick movement of the team thrown out behind by momentum, so as to fall back heavily on the cam. In backing, also, which may be done with the machine folded, the forks, after passing the center at the top, fall back heavily on the cams. A spring is therefore desirable for relieving the parts from severe concussion.

That part of the cam which governs the action of the forks in the ground is made of a separate and detachable piece, it being the wearing part of the cam, and is therefore as necessarily a separate piece as the point of a plow.

That movable section $r$ of the cam is a curved bar, forming the groove of the cam, pivoted at its upper end to the standard $s$ and at its lower end to the link $w$. From the link $w$ pass two other links, $w'$ and $w''$, the first named, $w'$, having its upper end pivoted to the hanger $u$, which extends from the under side of the foot-board, and the second named, $w''$, having its upper end pivoted to the elbowed actuating-lever $v$, which has its fulcrum on the upper side of the foot-board. This arrangement of the links and lever with the movable portion of the cam will permit it to be self-actuating sufficiently far to allow the forks to fold whenever the strain on this movable section shall reach a given pressure. Roots or other hard substances may be carried into the cam-groove and so wedge in as to endanger breakage of the movable section of the cam or parts of the fork. This arrangement will prevent such breakage.

From this recital of the construction and arrangement of the parts shown by the drawings it will be perceived that as the spader is drawn along its wheels, to which the forks are pivoted or hung, revolve, carrying the forks hung at equal distance apart around the circumference.

The friction-wheels at each end of the fork-bars rest upon the stationary cams, which are so eccentric in form as to carry the fork-bars at the forward part of the machine out far enough to cause the points of the teeth to strike the ground successively the same distance ahead as the spaces measure between the fork-bars or the pivots by which they are hung on the circumference of the wheels. The form of the cam is such as then to permit the fork-bar to gradually recede into the slot or recess in the wheel while the tooth is entering, so as to cause the point of the curved tooth in its entrance into the earth to describe a curve or cut the radius of which is the same as that by which the tooth is formed, following its point and filling its cut perfectly, and each fork successively doing the same thing at equal distances ahead and in unison with the regular and natural rotation of the main wheels in their forward movements. The tangential form of the cam here commences, producing any necessary sweep or movement of the point of the tooth in lifting its cut more or less severe, depending on the form given it. This part of the cam, including the portion that governs the entrance of the tooth into the earth, is a separate piece, and is the wearing part of the cam.

The wide point of the teeth is a valuable feature as being more cheaply made, less likely to break, cuts and breaks the way better in entering, and produces a better action at the bottom of the cut in lifting than any other form.

Beveling the concave side of the tooth makes it a self-sharpener, as in the working of the machine with animal power the wear is principally on the back or convex side. With steam-power, if applied to the axle to produce the revolution of the wheels, the wear would be on the concave side.

The stirrup or clamp here shown is different from those shown in my former patent, and the location of the key is different. I am not aware that such a tooth or such a clamp is used in any spading-machine ever made, and would not be adapted to any except where such bars are used in making forks. In this machine these features are valuable, being cheap, simple, durable, and readily replaced.

The casting of handles or cranks on the steel fork-bars is valuable as being the cheapest possible way of getting them on with necessary accuracy, and as being cheaply repaired in case of breakage.

Casting lugs on the ends of the fork-bars to which to secure the friction-wheels enables the replacing of the wheels and journals on which they revolve with little expense, and the bars will remain uninjured by wear for an indefinite time.

Quite an important feature is the alternating of the teeth, as, if not thus alternated, they would fold onto the stirrups or clamps of each other and expose the points to be broken in traveling with the machine folded.

What I claim as my invention as an improvement on rotary spaders or spading-machines, and desire to secure by Letters Patent, is—

1. The curved tine or tooth, widest at the point, with notch on the concave side of head to embrace the fork-bar and stirrup or clamp, and sharpened at the point by being beveled on the concave side, substantially as herein recited.

2. Securing the tooth or tine to the fork-bar by the stirrup or clamp and key, as herein recited.

3. The combination of the fork-bar, clamp, key, and tine or tooth, having the notch, as and for the purposes herein set forth.

4. Securing by casting the lugs on the ends of the fork-bars, to which to hang the friction rollers or wheels.

5. Casting the handles or cranks on the fork-bars, as and for the purposes described.

6. Such a location of the handles or cranks on the fork-bars in reference to the main wheels that when the main wheels are keyed in place they shall secure the forks in position, as herein named.

7. Driving the keys which secure the main wheels to the axles toward the center of the machine, so that the hubs of the cams, bearing against the heads of the keys, will prevent the keys from loosening or coming out.

8. The arrangement of the collars and sockets set forth for excluding the dirt from the interior of the cam-hubs.

9. Alternating the tines, as and for the purposes set forth.

10. The spring on or near the back part of the cam, for the purposes recited.

11. Making that portion of the central part of the cam which governs the action of the forks in the ground a separate piece, so that the same may be replaced, as herein stated.

12. The construction and arrangement of the links and levers for actuating the movable section of the cam and permitting the same to be self-actuating, as herein described.

This specification signed this 4th day of January, 1865.

CICERO COMSTOCK.

Witnesses:
 JAMES M. TAYLOR,
 JAMES A. BELL.